(12) United States Patent
Hoppe et al.

(10) Patent No.: US 6,592,306 B2
(45) Date of Patent: Jul. 15, 2003

(54) MACHINE TOOL COMPRISING A COLLECTING SYSTEM FOR CHIPS AND LIQUIDS

(75) Inventors: Gerd Hoppe, Habichtswald (DE); Alfred Geissler, Pfronten (DE); Karl Lechleiter, Oy-Mittelberg (DE)

(73) Assignee: Deckel Maho Pfronten GmbH, Pfronten (DE)

( * ) Notice: Subject to any disclaimer, the term of this patent is extended or adjusted under 35 U.S.C. 154(b) by 0 days.

(21) Appl. No.: 09/930,001

(22) Filed: Aug. 14, 2001

(65) Prior Publication Data
US 2002/0025236 A1 Feb. 28, 2002

(30) Foreign Application Priority Data
Aug. 23, 2000 (DE) .......................................... 100 41 355

(51) Int. Cl.[7] .......................... B23C 00/00; B23B 47/00; B01D 21/02
(52) U.S. Cl. .......................... 409/137; 408/67; 210/413
(58) Field of Search .......................... 409/137; 408/67; 29/DIG. 50, DIG. 53, DIG. 61, DIG. 77, DIG. 79, DIG. 94, DIG. 100; 100/117; 210/415, 413, 414

(56) References Cited
U.S. PATENT DOCUMENTS 3,235,087 A * 2/1966 Andrews et al. ............ 210/415
4,214,377 A * 7/1980 Maffet ......................... 210/767
4,364,831 A * 12/1982 Burns et al. ................. 210/298
5,205,686 A * 4/1993 de Caussin .................. 409/137
5,489,383 A * 2/1996 Yoshikawa .................. 210/413
5,586,848 A * 12/1996 Suwijn ........................ 409/137
5,833,851 A * 11/1998 Adams et al. ............... 210/415
5,875,979 A * 3/1999 Walters et al. ............... 241/299
5,951,219 A * 9/1999 Stadtfeld et al. ............ 409/137

FOREIGN PATENT DOCUMENTS

DE 4436002 A1 4/1996
JP 63068338 3/1988

* cited by examiner

Primary Examiner—William Briggs
Assistant Examiner—Dana Ross
(74) Attorney, Agent, or Firm—The Maxham Firm

(57) ABSTRACT

A machine tool for metal cutting having a collecting system for chips and liquids. Disposed below the work area is a pan having a transverse groove, a chip conveyor disposed in the transverse groove, a spiral-shaped conveyor element, a liquid collector on one side wall of the pan and a chip outlet disposed on the other side wall of the pan on the outlet end of the chip conveyor. To enhance the separation of liquids even when a large amount of chips is produced, an elongated screen element is disposed in the inner cavity of the spiral-shaped conveyor element, the screen element extending over at least part of the length of the conveyor element and terminating at the liquid collector.

5 Claims, 2 Drawing Sheets

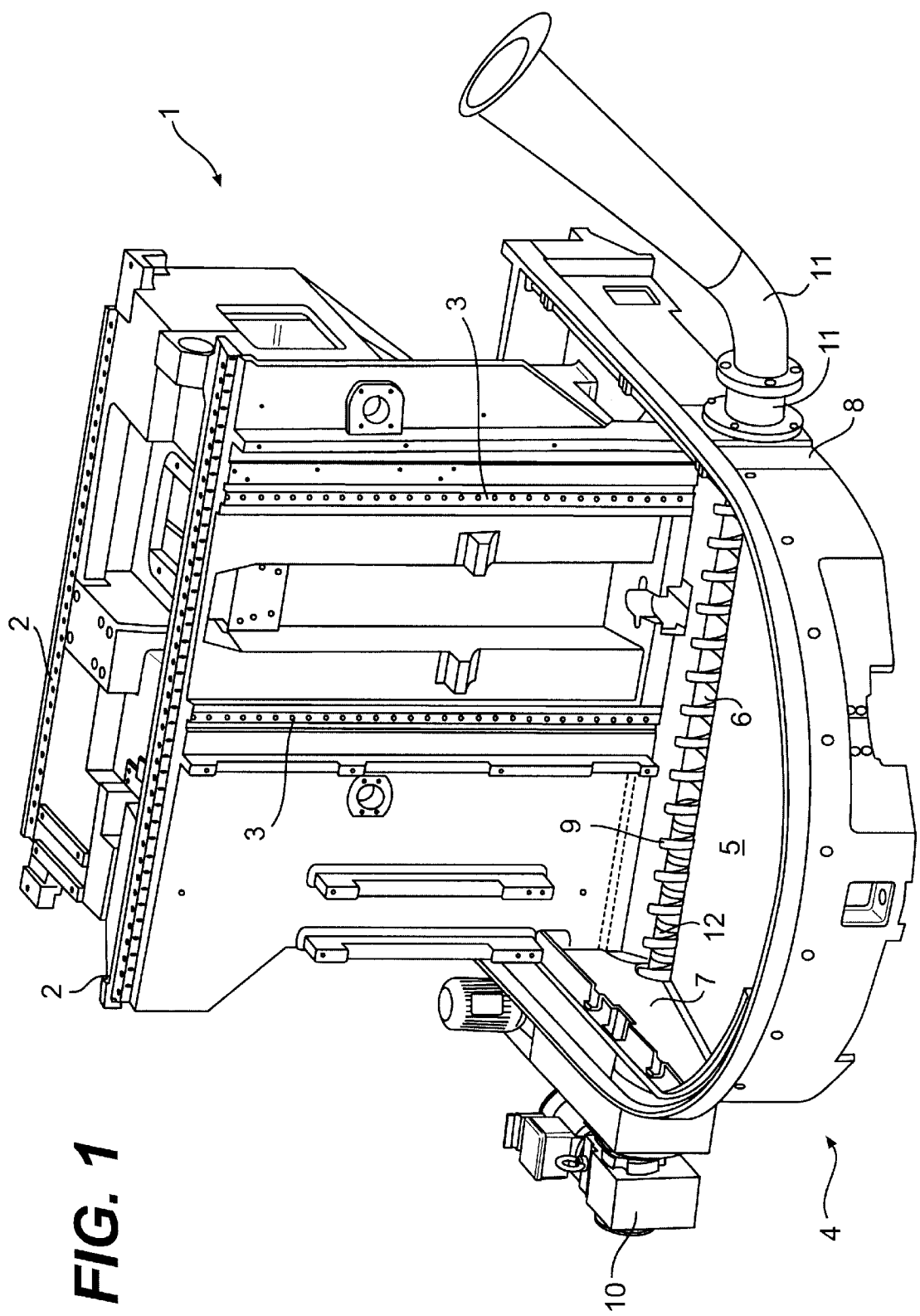

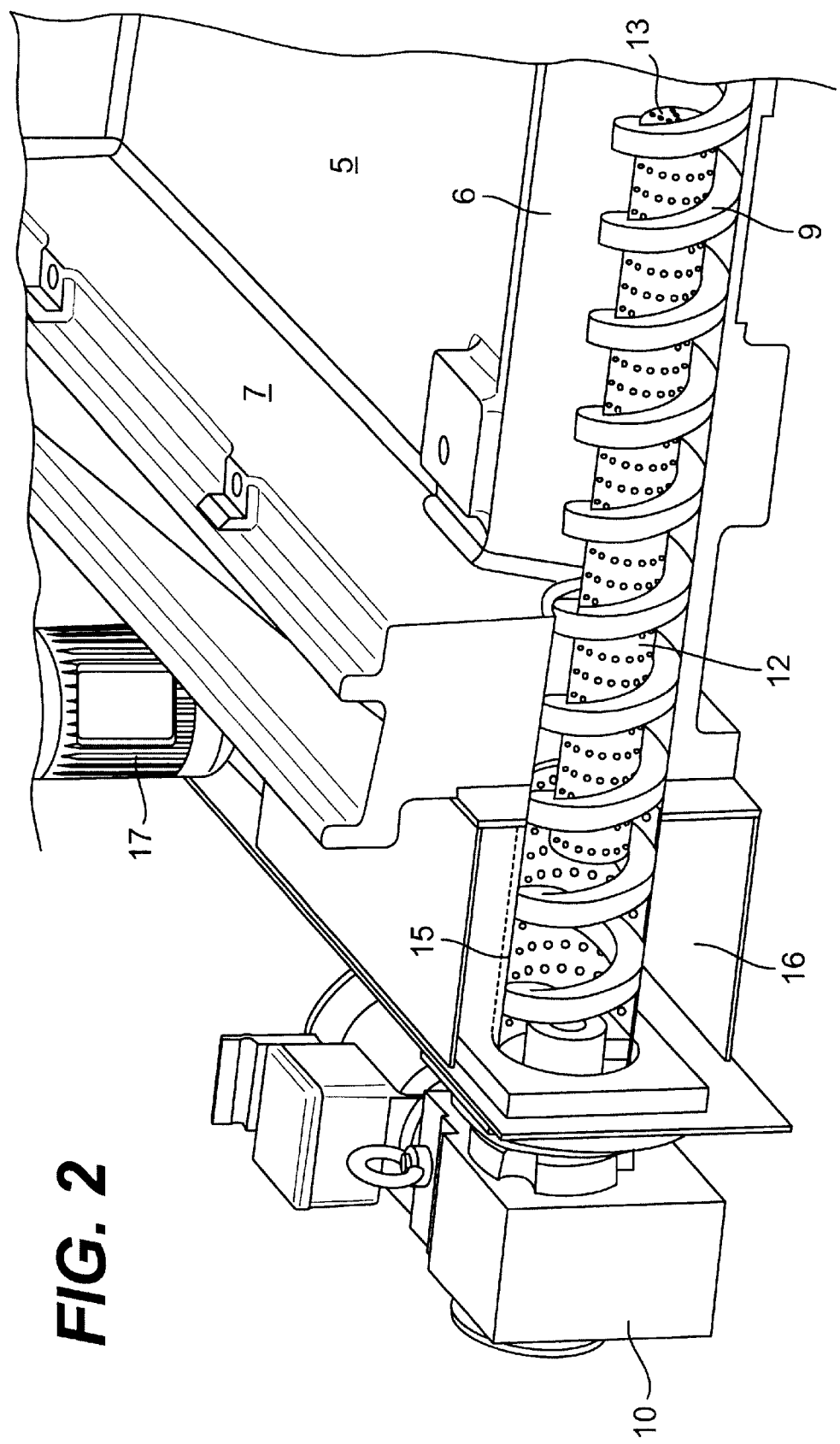

MACHINE TOOL COMPRISING A COLLECTING SYSTEM FOR CHIPS AND LIQUIDS

BACKGROUND

1. Field of the Invention

The invention relates to a machine tool and more particularly to a machine tool for cutting metal.

2. Background Discussion

New machine concepts, the increasing use of high-speed work spindles and the development of enhanced cutting tools have led to a fast increase of the cutting performance of modem machine tools in recent times. This also has led to a corresponding increased production of chips as well as an increased consumption of flushing and cooling liquids. In addition, the structure of the chips has also changed due to the use of high-speed work spindles, particularly due to the much higher cutting speeds. These factors result in increased requirements with respect to the collecting systems for the chips and liquids. Particularly when light metal workpieces are machined with high-speed work spindles, large amounts of chips are produced, which are collected together with the correspondingly increased amounts of flushing and cooling liquids in a pan provided below the work area of the machine.

A collecting system for chips and liquids on a machine tool has already been developed, the collecting system having a pan provided below the work area of the machine tool and having an inclined bottom as a collecting container for the resulting chips and liquids. The pan is provided with a transversely extending groove in the connecting area to the stand or bed of the machine, and a conveyor element consisting of a helical spiral rotating in the groove for conveying the chips collected in the groove to a chip outlet provided in a pan wall. The liquid collected in the pan flows through a drainage provided in the other pan wall into a collector disposed below it from which it is usually removed for treatment and cleaning. To avoid an undesired entry of chips into said collector, a perforated pipe section surrounding the driving side part of the tube spindle, having a tight fitting tolerance, is arranged in the drainage area so that chips adhering to the inner wall of the pipe section are taken along by the rotating conveyor spiral. With extremely high cutting performances and a possibly intermittent operation of the collecting system, the formation of chip clusters interspersed with liquid could not always be prevented, and caking of liquid components and chips often occurred. This hindered an effective removal of all generated substances and, in particular, resulted in problems during restart after extended standstill times.

Accordingly, there is a need for a machine tool for cutting metal with an improved collecting system for chips and liquids. The present invention satisfies these needs and provides related advantages as well.

SUMMARY OF THE INVENTION

It is a primary purpose of the invention to increase the efficiency of a collecting system for chips and liquids of a machine tool and to obtain an enhanced separation of the liquid even during extremely high chip production.

According to the invention, the purpose is satisfied in that an elongated screen element extends over at least part of the length of the conveyor element and terminates at or opens toward the liquid collector and is provided in the inner cavity of the helical conveyor element.

The screen element, which is efficaciously formed as a screen tube, will prevent chips from entering the inner cavity of the conveyor spiral. The chips are taken to the collector by the liquid flowing into the outlet. The liquids deposited together with the chips will drop through the screen tube, whereby an effective separation of the liquids from the chips is obtained while the length of the screen tube ensures a sufficiently large screen surface.

According to an efficacious embodiment of the invention the screen tube is fixedly connected to the conveyor spiral and rotatable together with it, its outlet side end protruding in a perforated tube section disposed above the liquid collector and being either fixed to the outer side of the spiral so as to rotate with it or surrounding the spiral in a stationary manner. In the latter case, chips adhering to the inner wall of the tube and possibly to the perforations are wiped away by the rotational movement of the spiral.

According to a further development of the invention, the screen tube is not rotatable and is positioned on the inside of the conveyor spiral with little tolerance. In this embodiment a wiping effect, for possibly adhering chips, is obtained by the rotational movement of the conveyor spiral. In this embodiment the screen tube may be provided with sieve openings only in its upper region so that the entering liquid will flow to the outlet on the continuous bottom part. For the non-rotary support of the screen tube, rod elements or axes are provided on one or both tube ends. The rod elements or axes are fixed to one or both side walls of the pan or to another stationary component to keep the pipe centered in the inside of the spiral.

BRIEF DESCRIPTION OF THE DRAWING

The objects, advantages and features of the invention will be more clearly understood from the following detailed description, when read in conjunction with the accompanying drawing, in which:

FIG. 1 is a perspective view of a movable stand of a cutting machine tool provided with the collecting system according to the invention; and FIG. 2 is an enlarged section of FIG. 1 showing components of the collecting system.

DETAILED DESCRIPTION OF THE PREFERRED EMBODIMENTS

The body of the machine tool shown in FIG. 1 comprises movable stand 1 provided with horizontal and vertical guide rails 2 and 3 for supporting and guiding machine aggregates (not shown). On the lower end of movable stand 1, pan 4 is disposed for collecting the chips and the involved flushing and cooling liquids generated during the cutting operation. Pan bottom 5 is inclined toward transversely extending groove 6 extending from one side wall 7 to the opposed side wall 8 of pan 4. Conveyor spiral 9 is disposed in groove 6, the spiral protruding through an outlet in side wall 7. The spiral is rotated by laterally annexed gear motor 10. The right end of spiral 9, according to FIG. 1, is borne in side wall 8 immediately in front of chip outlet 11, which is assembled from pipe sections in the conventional way.

In the inner cavity surrounded by conveyor spiral 9, screen tube 12 is disposed, which has about one third of the length of the conveyor spiral in the embodiment shown. As can be seen in FIG. 2, the driving side end of conveyor spiral 9 is surrounded by perforated pipe section 15 with little tolerance, the pipe section being disposed above liquid collector 16 from which the collected liquid is removed by means of a suction pump 17 in the conventional way. Screen tube 12 protrudes into perforated pipe section 15 on the outlet side and terminates above collector 16. On the entrance side, screen tube 12 is closed by screen plate 13. Om the entrance side, screen tube 12 is closed by screen plate 13.

In the embodiment shown in FIG. 2, perforated pipe section 15 on the outer side of conveyor spiral 9 and screen tube 12 on the inner side of the conveyor spiral are, for example, fixed by welding so that the two pipe elements 12 and 15 will rotate together with conveyor spiral 9.

In another embodiment of the invention perforated pipe section 15 or screen tube 12, or both, may be positioned opposed to the conveyor spiral so as not to be rotatable so that a wiping effect is obtained for the adhering chips by the rotational movement of conveyor spiral 9. In this embodiment only the bottom part of pipe section 15 needs to be provided with perforations, and sieve openings are only required in the upper part of screen tube 12. The closed bottom part of screen tube 12 then serves as a flow groove for the liquid. For the non-rotary support of screen tube 12 inside conveyor spiral 9, for example, a dimensionally stable extension element having a small diameter may be fixed to its entry side end plate 13, the extension element extending to side wall 8 and being fixed to side wall 8 behind the end of conveyor spiral 9 or in the chip outlet of side wall 8, for example, by means of radial bridges. The extension element may be formed as a rod or pipe and should have the smallest possible diameter so as not to appreciably affect the conveying performance of conveyor spiral 9.

In view of the above description it is likely that modifications and improvements will occur to those skilled in the relevant technical field which are within the scope of the accompanying claims. The invention is to be limited only by the appended claims considering their spirit and scope, and equivalents.

What is claimed is:

1. A machine toot for cutting metal, the machine tool comprising:

a collecting system for chips and liquids disposed below the work area and comprising:

a pan having side walls and a transverse groove;

a chip conveyor having an outlet end, said conveyor being disposed in the transverse groove and provided with a rotating spiral-shaped conveyor element;

a liquid collector on one side wall of the pan; and a chip outlet disposed on another side wall of the pan on the outlet end of the chip conveyor, a screen tube is disposed in the inner cavity of the spiral-shaped conveyor element, said screen tube extending over at least a part of the length of the conveyor element and terminating with one end at the liquid collector wherein one end section of said rotating spiral-shaped conveyor element is surrounded by a pipe element perforated at least in its bottom portion above the liquid collector, said screen tube protruding into said pipe element.

2. The machine tool according to claim 1, wherein the screen clement is provided with a cover plate with sieve openings on its other end.

3. The machine tool according to claim 2, wherein the screen tube is non-rotatable and surrounded by the rotating spiral-shaped conveyor element.

4. The machine tool according to claim 3, wherein the screen tube is held, with at least one end, in at least one side wall of the pan by means of an extension element.

5. The machine tool according to claim 2, wherein the screen tube is rotatable and fixedly connected to the conveyor spiral.

* * * * *